United States Patent [19]

Taylor et al.

[11] 3,819,412
[45] June 25, 1974

[54] PLATES FOR LEAD ACID BATTERIES
[75] Inventors: Alwyn H. Taylor, Boston; Jose Giner, Sudbury; Franz Goebel, Marlboro, all of Mass.
[73] Assignee: Tyco Laboratories, Inc., Waltham, Mass.
[22] Filed: Feb. 7, 1972
[21] Appl. No.: 224,176

[52] U.S. Cl. ................................. 136/10, 136/26
[51] Int. Cl. .......................................... H01m 39/06
[58] Field of Search .............................. 136/10–12, 136/26, 27, 120, 143

[56] References Cited
UNITED STATES PATENTS

| | | | |
|---|---|---|---|
| 549,023 | 10/1895 | Rooney | 136/12 |
| 549,079 | 10/1895 | Rooney | 136/12 |
| 553,596 | 1/1896 | Ribbe | 136/12 |
| 880,422 | 2/1908 | Tate | 136/10 |
| 926,710 | 6/1909 | Tate | 136/10 |
| 1,060,216 | 4/1913 | Tate | 136/10 |
| 3,003,013 | 10/1961 | Duddy | 136/10 |
| 3,033,909 | 5/1962 | Urry | 136/120 R |
| 3,239,380 | 3/1966 | Berchielli | 136/120 R |
| 3,443,994 | 5/1969 | Tammunen | 136/10 |
| 3,445,296 | 5/1969 | Abe et al. | 136/120 |
| 3,496,025 | 2/1970 | Abe et al. | 136/120 R |
| 3,589,942 | 6/1971 | Leitz, Jr. et al. | 136/86 D |

Primary Examiner—A. B. Curtis
Assistant Examiner—C. F. LeFevour
Attorney, Agent, or Firm—Schiller & Pandiscio

[57] ABSTRACT

The invention is a new composite battery plate for lead acid batteries. The preferred embodiment is a bipolar plate characterized by a plastic substrate as the support for the active positive and negative masses with lead strips on each substrate providing electrical conduction through the substrate. The battery plate makes possible a battery capable of supplying high rate power pulses and of accepting high rate charge pulses, both of short duration, and having a superior cycle life and improved energy density at high power density operating conditions.

19 Claims, 6 Drawing Figures

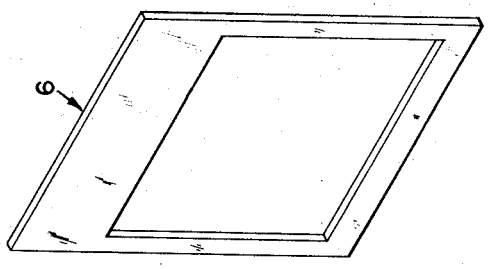
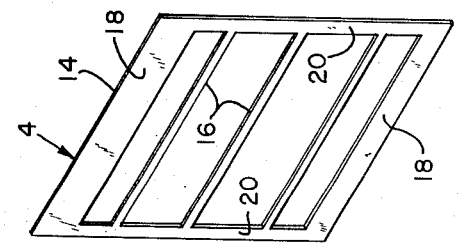
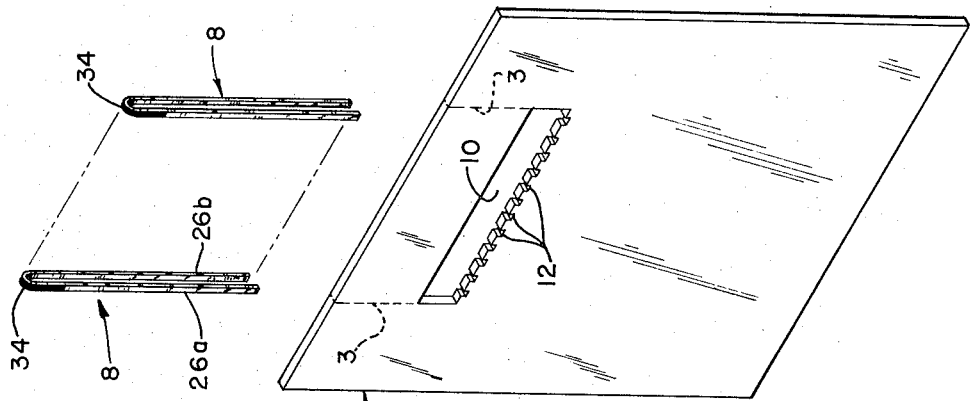
FIG. 1
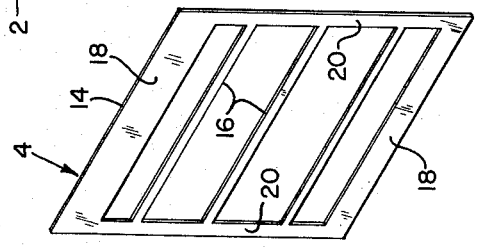
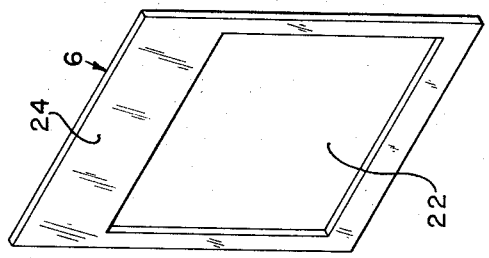

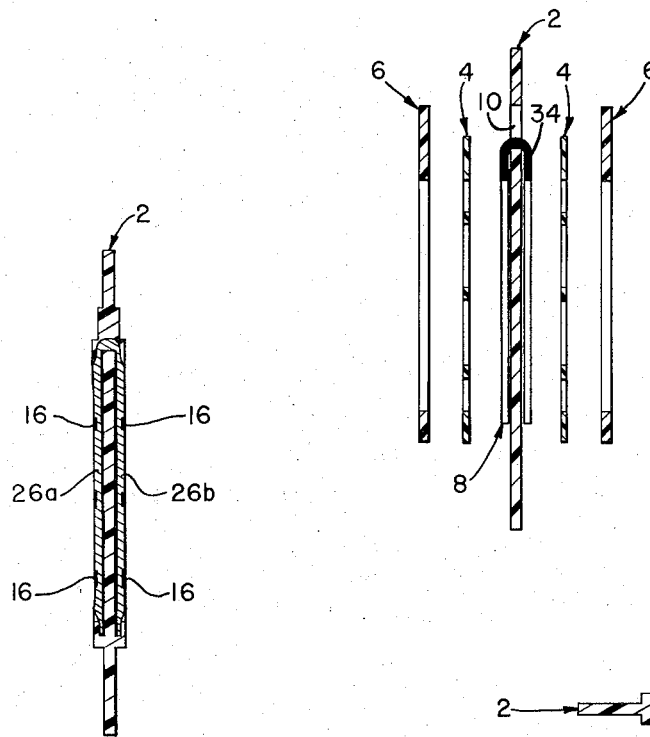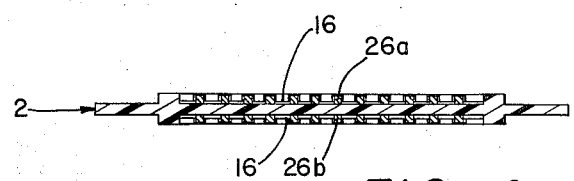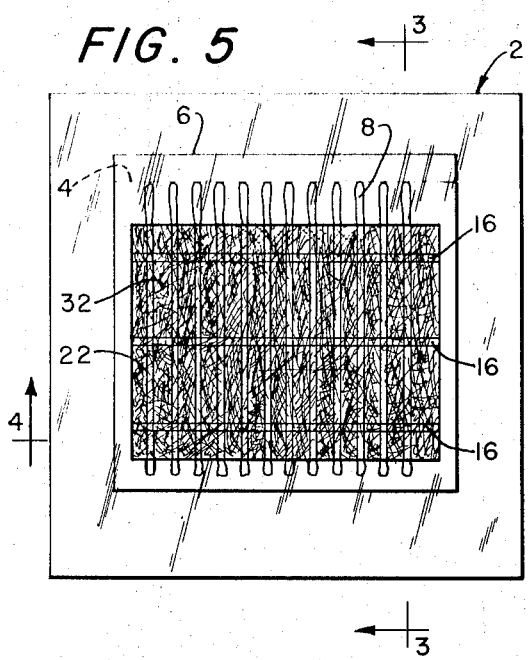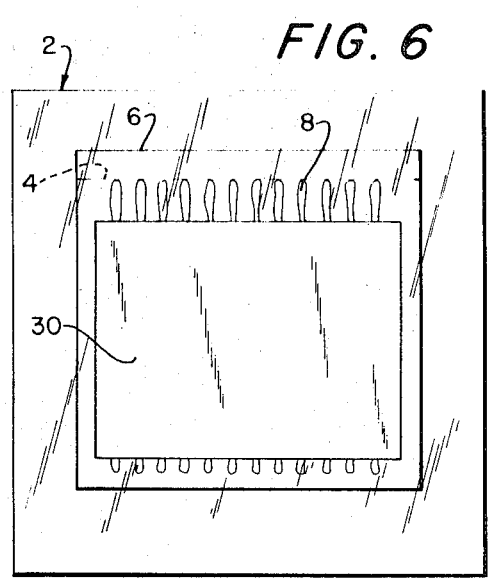

PLATES FOR LEAD ACID BATTERIES

This invention relates to electric batteries and more particularly to a new and superior battery plate for a lead acid battery system.

As a result of the growing problem of air pollution, a massive public interest has developed in battery powered vehicles as a replacement for the conventional gasoline fueled, spark-ignition powered vehicles. In addition to all-electric vehicles, substantial attention has been focused on the so-called "hybrid" vehicle power systems in which an electric power source is coupled to and assists an internal combustion engine in providing vehicle traction power. In the typical hybrid system the gasoline engine operates at a near constant speed under normal load conditions and the electrical power unit supplies energy primarily under peak load conditions, e.g. during acceleration or hill climbing. The hybrid systems offer the promise of less air pollution than results from operation of conventional gasoline engine vehicles.

The lead acid battery is attractive as a power source for vehicles in view of its familiarity to the public and the manufacturing art and production facilities which have been developed as a result of its extensive use in the electrical system of conventional gasoline powered vehicles. The most appealing features of conventional lead acid batteries are the recharge capability, reasonable standby and cycle lift (the latter at moderate rates) and relatively low cost. Lead acid batteries designed for traction purposes cost between 50 and 60 cents/pound, while conventional SLI type lead acid batteries cost about 25 cents/pound. An SLI battery is one designed for automotive starting, lighting and ignition purposes.

For vehicular applications, however, the energy density is only moderate and approaches 14 watt-hr/pound and 20 whr/pound for the above two types of conventional lead acid batteries respectively at the 20 hr. discharge rate. These values are somewhat less than desirable in regard to using conventional lead acid batteries as the primary energy source for electric vehicles. An improvement in energy density is thus required.

There are additional problems associated with the use of conventional lead acid battery designs for vehicular applications which have further discouraged their use as the power systems for all-electric or hybrid vehicles to replace conventional gasoline powered vehicles. Thus, for such applications a battery system must also have a high power density (be capable of supplying high rate discharge pulses of short duration), a capability for accepting high rate charge pulses also of short duration, and a long cycle life at high power density operating conditions. The conventional lead acid battery does not satisfy these requirements. The most advanced design (a "pile type" construction) has a power density of 60–70 watts/pound which is deemed inadequate by automotive engineers. A conventional traction type lead acid battery can sustain only 35 watts/pound for short periods.

Even at low power densities (low rates of discharge), the coulombic efficiency of the active electrochemical mass, i.e., the paste on the battery plates, is no greater than about 50 percent (of the theoretical). The paste utilization (taking the coulombic efficiency at low power densities as the 100 percent utilization point) also decreases rapidly as the discharge current is increased and typically may be below 20 percent at high power densities. Thus at high power ratings, the energy available from conventional lead acid batteries decreases substantially. For example, even with a fresh thin plate, SLI battery, an energy density only in the order of 6 whr/pound is obtained at high power ratings (~5C) compared to about 17 whr/pound at moderate ratings (C/5). The above is true for plates of all thicknesses; but there is another important consideration, namely, that the utilization in depth of the active mass at a given discharge rate decreases as plate thickness increases.

Accordingly, it is recognized that more but thinner plates should be used, especially when operating at high rates of discharge. However, thin plates present another problem. The conventional lead acid battery plate comprises a lead or lead alloy grid on which the active mass is supported. In conventional automotive batteries the grids are made of lead-antimony or lead-calcium since these alloys have greater intrinsic strength than lead. However, even the latter alloys have marginal strengths when formed into grids with a thickness of 50 mils or less which is desirable for high power density batteries. Furthermore, such thinner grids are also more difficult and hence more expensive to cast (especially lead-calcium grids).

Apart from the question of mechanical strength, there is another limiting factor with thin lead or lead alloy grids and this is plate failure by grid corrosion. The likelihood of this mode of failure is increased as grid thickness is reduced. It is to be noted that of the three grid materials mentioned, pure lead is least susceptible to this mode of failure. Associated with this problem of corrosion is the problem of grid expansion due to the lower density of the formed $PbO_2$ as compared with lead. This expansion sometimes leads to plate failure due to loosening of the contact between the active mass and the grid. This expansion problem is somewhat less with lead than with lead-calcium due to lead's slower corrosion rate. The problem is still less with alloys of high antimony content (generally about 4.5 percent Sb) because dissolution of antimony compensates for the volume decrease of $PbO_2$.

The cycling life of conventional plates is limited by one or more of the foregoing factors and also by resistance losses in the grid. In thin battery plates of conventional design which have a single current takeoff terminal, an increase in resistance occurs along and down the plate away from the terminal. Because of the increase in resistance in these directions, it is easier to discharge the paste in those areas closest to the takeoff terminal. Hence, uneven utilization of the active mass results and a high local depth of discharge occurs even when the overall depth of discharge is shallow. As a consequence, the plate undergoes shedding of paste which in turn severely limits cycling life.

The primary object of this invention is to provide a battery plate for a lead acid battery system which eliminates or substantially reduces the above-noted limitations of conventional lead acid battery plates and makes possible a high power density and improved energy density lead acid battery.

A more specific object is to provide a relatively thin battery plate structure which exhibits relatively low resistance losses and provides a lead acid battery that has a high energy density at both high and low rates of discharge, has a relatively long cycling life at high power/- shallow discharge ratings, can be made in a wide variety of sizes with a variable number of cells, has minimum corrosion and expansion problems, and is capable of maintenance-free operation for long periods.

Another specific object is to provide a battery plate for a lead acid battery system that incorporates a novel paste support structure.

Still another specific object is to provide a bipolar battery plate for a lead acid battery system.

A further object of this invention is to provide a new lead acid battery that constitutes a significant improvement over the prior art.

The foregoing objects are achieved by providing a battery plate comprising a base plate in the form of a sheet of an electrically insulating plastic, a plurality of conductor strips of a lead composition overlying said base plate, strip retention means attached to said base plate and retaining said strips against said base plate at selected points, and an electrochemically active coating overlying said strips and attached to said base plate. In the preferred embodiment of the invention the strips are made of essentially pure lead and the battery is bipolar, with an array of said strips and a strip retention means on each side of said base plate and a negative coating on one side and a positive coating on the other side of said base plate, each strip of one array being connected to a corresponding strip of the other array.

Other features and many of the attendant advantages of this invention are described in the following detailed description of the invention which is to be considered together with the accompanying drawings wherein:

FIG. 1 is an exploded view of a bipolar plate made in accordance with this invention but without any active mass;

FIG. 2 is a cross-sectional view showing the lay-up arrangement of the parts shown in FIG. 1;

FIG. 3 is a vertical sectional view of a thermoformed plate taken along line 3—3 of FIG. 5;

FIG. 4 is a horizontal sectional view of a thermoformed plate taken along line 4—4 of FIG. 5;

FIG. 5 is a face view of the thermoformed plate after application of paste-retaining flock; and FIG. 6 is a face view of the same plate after it has been pasted.

The present invention is premised on the concept that in order to increase the energy density of lead acid batteries, especially at high rates, and to minimize paste shedding as occurs due to high local depth of discharge, it is necessary to work at low current densities, i.e., it is necessary to spread the active mass over a larger area by using more and thinner plates. Furthermore, in order to do this, the following conditions should be met: (1) the ratio of passive components (i.e., support structure) to active components (i.e., active mass and electrolyte) has to be kept at a reasonable value; (2) the plate has to have mechanical stability; and (3) the support structure has to have a thickness compatible with the expected corrosion rate and desired battery life. These requirements are met by a thin battery plate of the character described comprising a plastic support for the electronically conducting lead strips and the electrochemically active mass, and particularly by a bipolar battery plate.

The bipolar plate derives its name from its electrode configuration. The positive electrode of one cell and the negative electrode of the next cell are on opposite sides of an electrically conductive but electrolyte-impermeable substrate with all of the current produced by the battery passing across the substrate. In a bipolar battery all the cells operate in series and hence it is essential to avoid internal leakage which can cause discharge of a plate by an electrochemical mechanism. Since corrosion of the electrolyte-impermeable substrate can produce internal leakage (as well as plate buckling), the construction of the substrate and the choice of the materials used in its construction is of prime concern. A variety of materials have been considered for the conductive substrate and found unsuitable. A lead sheet has to be of impractical thickness in order to obtain long life without penetration due to corrosion and furthermore, the predominant formation of $PbO_2$ on the positive side tends to cause buckling. Carbon tends to oxidize at the high potential of the $PbO_2$ electrode and evolves hydrogen at high rates at the potential of the negative Pb electrode. Metals such as aluminum, magnesium, titanium and titanium nitride either exhibit severe corrosion in sulfuric acid or form oxides which act as a dielectric and are difficult to control. Conductive plastics, i.e., plastics with a conductive filler, are subject to attack of the filler aggravated by the high surface of the filler-plastic interphase.

Accordingly, the preferred embodiment of the present invention comprises a conductive substrate in the form of a flat sheet of an insulating plastic material with an array of parallel spaced lead strips as electronic conductors on each side of the plastic sheet. The lead strips are secured to the substrate at several points. The positive and negative active masses are applied to opposite sides of this substrate, with each array of lead strips and the associated active mass forming a discrete electrode. The strips in one array are connected to the strips in the opposite array so as to serially connect the positive and negative electrodes of each plate.

Specific details of the bipolar plate constituting the preferred embodiment of the invention and the method of fabricating it will now be described. Referring to FIGS. 1 and 2, the components of the plate include a base plate 2, two grids 4, two frames or "borders" 6, and a plurality of U-shaped lead strips 8. One grid 4 and one frame are disposed on each side of base plate 2. The base plate, grids and frames are all die cut out of sheets of a polycarbonate plastic which is electrically insulating, thermoplastic and stable in 1.28 specific gravity $H_2SO_4$. A suitable commercially available polycarbonate is the one marketed by the General Electric Company under the registered trademark "Lexan." Other polycarbonate materials also may be used, such as that sold by Mobay Chemical Company of Pittsburg, Pennsylvania under the name of "Merlon."

The illustrated base plate is rectangular in shape and is provided with a straight horizontally extending hole 10 adjacent its top end. The lower edge of hole 10 has a plurality of narrow evenly spaced slots 12. The grids 4 also are rectangular. Each grid 4 consists of an open frame or border 14 and a plurality of parallel spaced horizontal struts or bars 16. The upper and lower legs 18 of the frame portion of the grid 4 are wider than its side legs 20 which are wider than the struts 16. Each of the frames 6 also is rectangular and defines an aperture 22. The sides and bottom sections of frame 6 preferably have the same widths as the corresponding legs of the frame of grid 4. However, its top section 24 is oversized, being larger in its corresponding dimensions than the elongate hole 10 in base plate 2.

The lead strips 8 actually serve as the conductive strips for both sides of the battery plate. Preferably they are cut from a flat sheet and then bent into the illustrated U-shape. They may also be made from lead wire of round or other suitable cross-section. These strips are mounted to the base plate so that their legs 26a and 26b extend along opposite sides of the base plate and their connecting portions project through hole 10 and reside in the slots 12. The slots 12 thus act as spacers for the strips so that they will form a uniform array when pasted over. Of course, it also is possible to form the legs 26a and 26b as separate elements and to weld them together at the hole 10 after they are positioned on opposite sides of the base plate. However, this alternative construction technique is less favored due to the need for welding equipment and a special jig to hold the separate strip elements in place while they are being welded together.

The base plate 2 is made of relatively thick sheet material; the grid 4 is made of relatively thin sheet material; and the frame 6 is made of sheet material that is thicker than that of grid 4 and preferably thinner than that of base plate 2. The primary purpose of grid 4 is to mechanically hold the lead conductors to the base plate at localized points while the frame 6 enhances the rigidity of the base plate and facilitates control of paste thickness as hereinafter described. Note that the reason for having the top section 24 of frame 6 large enough to conceal hole 10 is to prevent acid leakage by splashing over the top of each plate from one cell to another.

The base plate, grids, frames and lead strips are bonded to each other to form an integrated paste-supporting structure or substrate.

In addition to the foregoing components, the battery plate includes the positive and negative active masses or pastes 30 (FIG. 6) and paste retention means. The paste retention means preferably consists of a flock or mat of fibers 32 of an inert light weight material such as glass or a synthetic plastic. A preferred synthetic material is a copolymer of acrylonitrile and vinyl chloride such as the one available commercially under the registered trademark "Dynel." These fibers may be preformed as a thin mat and applied to the base plate under or between the lead strips. In either case the fibers are bonded to the base plate so as to serve as effective paste retaining surfaces.

The preferred procedure by which the bipolar plate is formed will now be described.

First of all a solution of about 5 percent polycarbonate polymer in methylene chloride is painted onto pre-etched portions of the legs 26a and 26b of the lead strips adjacent their connected ends. The painted portions are shown at 34. The etching is performed by briefly dipping these portions into a dilute hydrogen peroxide acetic acid solution. The methylene chloride solvent is allowed to evaporate off at room temperature. Then the lead strips are applied to the base plate so that they reside in the slots 12 and their legs extend down along opposite sides of the base plate as shown in FIG. 2. Then the base plate, grids and frame are laid up against one another in the order shown in FIG. 2 with the legs 20 and bottom section 18 of the grids 4 aligned with each other and the corresponding portions of frames 6. The upper sections of the grids and frames are aligned as shown in FIG. 2. The topmost sections 24 of the frames 6 cover the corresponding legs 18 of the grids and also the hole 10 in base plate 2. This assembly is then placed in a two part pressing mold and compressed under a temperature at which the thermoplastic components will thermoform and fuse together. For a polycarbonate such as Lexan, the pressing temperature is about 300° F. Preferably the pressing mold includes suitable stops between its mating halves to prevent undue squashing of the assembled components. It is to be noted that this pressing operation may produce some flattening of the lead strips at those points where they are sandwiched between the base plate and the grids. The painted portions of the lead strips make a strong bond to the grids 4 and are also firmly welded to the adjacent portions of the frames 6, thus minimizing the possibility of acid leakage at the point where the lead conductors pass through the base plate. The upper sections 24 of the frames 6 are thermoformed, i.e., molded, into and fill the hole 10 in base plate 12. When bonded together the several plastic components form an integrated or one-piece substrate structure. For convenience of illustration the several components are represented by different cross-hatching in FIGS. 3 and 4 and full lines in FIG. 5 to show how they are aligned in layup and to better show how the grids and frames are reformed under heat and pressure.

This substrate structure is removed from the mold, cooled and then the fibrous flocks 32 are applied. Preferably this consists of coating both sides of the base plate 2 in the pasting apertures defined by the frames 6 with methylene chloride, and then immediately dropping loose chopped fibers of glass, Dynel or other suitable material onto the wetted surface. The fibers adhere to the solvent-softened surface and form a coarse mat or flock. After the solvent has evaporated, excess fibers are brushed off the surface.

If the fibers are applied as a preformed mat, a different preferred procedure is followed. The preformed mats are cut to sizes corresponding to the pasting areas which are defined by the apertures 22 of frames 6. Preferably the mats have a thickness no greater than that of the grids. The mats are each soaked in a 1–2 percent solution of polycarbonate polymer in methylene chloride. The solvent is allowed to evaporate and then the mats are solvent bonded at selected points to opposite sides of base plate 2. This assembly, plus the aforementioned lead strips, grids and frames, is then thermoformed together under heat and pressure in a suitable press mold so as to cause the mats to bond fully to the base plate. Concurrently the mats are bonded to the grid struts and the base plate, grids and frames are bonded to each other to form the integrated one-piece plate structure.

Pasting is accomplished after the thermoforming and fiber bonding operations have been completed. This is done in a conventional manner. Conventional paste materials may be used and these are cured and formed into positive and negative active masses according to usual industry techniques. Preferably, however, glass or Dynel fibers are added to the positive and negative pastes to improve mechanical stability during cycling. Preferably about 0.2 percent of the paste mixtures are fibers. Among the paste materials that are useable are Universal Grenox Oxide, containing 25 percent free lead and balance orthorhombic PbO, available from N.

L. Industries; and Barton VLY Oxide, containing less than 2 percent Pb, and balance comprising six parts orthorhombic PbO and four parts tetragonal PbO (also produced by N. L. Industries). Still other suitable pastes may be used, e.g. those containing up to 25 percent $Pb_3O_4$. Tetrabasic lead sulfate may also be used as a starting material. See also articles by Biagetti et al., Bell System Technical Journal, Volume 49, Page 1,305 (1970).

Following is a specific example of how to produce bipolar plates according to this invention and a description of comparison tests made with cells embodying such bipolar plates and cells embodying conventional thin plates from a fresh commercial SLI lead acid battery.

A number of bipolar plates were made according to the procedure outlined above using a base plate, grids and frame members made of Lexan. The base plates had a thickness of 20 mils, the grids each had a thickness of 5 mils, and the frames each had a thickness of 15 mils. Twelve lead strips, each having an overall length of 4.9 inches before being bent into a U-shape, were mounted on to each base plate with even spacing between them. For some of the plates the lead strips were cut from a 20 mil thick lead sheet to a width of 60 mils. For the rest of the plates the lead strips were sections of 20 mil diameter, round lead wire. Each grid had three horizontal struts each about one sixteenth inch wide. The apertures of frames 6 had an area of about 34 $cm.^2$. For some plates, glass fiber mats measuring 3 mil thick were cut to the size of the apertures of the frames and bonded to opposite sides of each base plate before the lead strips were attached. For other plates, Dynel fibers were attached to the base plate 2 in the manner previously described. Pastes of Universal Grenox Oxide prepared by conventional means and containing 0.2 percent Dynel fibers were applied to opposite sides of the substrate over the full expanse of the pasting area as defined by the apertures 22 of frames 6 so that they were flush with the frames, i.e., so that they each had a thickness of about 20 mils or the combined thickness of the grid and frame. Thus the combined thicknesses of the two layers of paste and the base plate was about 60 mils.

Curing of the pastes was affected at a temperature of about 72° F for no less than 72 hours. Humidity control during curing was not strict and was achieved in the initial stages merely by covering the pasted plates with damp cloth. The latter also dried out during the curing process. After 72 hrs. the plates were oven dried at about 150° F for a further 6 hrs. Following this the total weight of the paste per plate was 16.5 gms., that is, approximately 8.25 gms. of paste on each side of the plate. Each bipolar plate was then mounted in a test cell incorporating two separate "Plexiglas" (polymethylmethacrylate) holders and two acid resistant rubber gaskets, the latter to ensure leak-free operation. The bipolar plate was then clamped along its two sides and bottom edge between the holders with rubber gaskets. Prior to formation each bipolar plate was soaked in 1.08 sp. gr. $H_2SO_4$ in the above assembly generally for 12 hrs. Then conventional plates comprising lead grids and Universal Grenox paste were inserted into the cell on each side of the bipolar plate. Formation of the negative and positive active masses respectively was accomplished by connecting one conventional plate to the positive side of a current source and the other conventional plate to the negative side of the same current source, and passing about 7.4 amp-hours of current through the entire cell over a 38 hr. period. In each test cell an industrial polyethylene separator having a 30 mil backing and a 45 mil ribbing was placed between the bipolar plate and each of the head plates. Inserted between each separator and the bipolar plate was a 3 mil glass mat which served as a paste retainer. For plate testing as described below, the electrolyte in which the bipolar plates were formed was replaced with 1.28 sp. gr. $H_2SO_4$. The quantity of electrolyte was generally about 18 milliliters which was added on each side of the bipolar test plate.

For comparison test purposes a second group of cells were constructed from industrial positive or negative plates removed from a new commercial thin plate six cell battery. This commercial battery consisted of 90 plates, with seven positives and eight negatives per cell each measuring 5.2 × 6.1 inches overall. These positive and negative plates had thicknesses of 0.060 and 0.050 inch respectively. The weight of the paste was 126 grams on the positive plate and 100 grams on the negative plate. The positive and negative plate grids each weighed about 70 grams and the grids were made of lead-antimony alloy. The battery capacity at C/20 was rated at 96 amp-hrs. These plates were placed in individual chambers with excess 1.28 sp. gr. $H_2SO_4$ (about 1,400 milliliters per chamber). When testing individual ones of these positive plates, the negatives in the test cells were overdesigned, i.e., two negatives were used, one on either side of the test positive. The situation was reversed when testing each negative plate.

Selected cells from each group were subjected to comparison tests at 30° C. Cell voltages, measured versus $Hg/Hg_2SO_4$ reference electrodes, were recorded where possible during testing.

Three positive and two negative conventional battery plates and five bipolar plates were subjected to testing according to a basic predetermined testing procedure, except that the test sequence for the bipolar plates was modified as hereinafter described. The basic predetermined testing procedure consisted of the following sequence: (1) plate completely discharged at $c/5$ rate to determine capacity; (2) plate completely charged at $c/5$ rate; (3) plate discharged to 20 percent of capacity at $c/5$ rate; (4) plate cycled for 100 cycles, starting with discharge; (5) plate charged completely at $c/5$ rate; (6) plate completely discharged at $c/5$ rate to determine capacity retained; and (7) repeat from step (2) until cell failure.

With respect to the bipolar plates, the testing procedure was modified after the initial C/5 capacity evaluation, consisting of step (1) in which they were found to have an initial C/5 capacity of 1.09 amp-hours. The modification consisted of adding 1.8 vol. percent $H_3PO_4$ to the electrolyte for the purpose of maintaining cycle life on the subsequent high rate cycle testing. Then the plates were recharged at the C/5 rate and then the C/5 capacity was redetermined. Next the plates were charged at the $c/5$ rate to full capacity (based on the initial capacity) and subsequently discharged to 80 percent of total capacity based on the revalued capacity, i.e, with $H_3PO_4$ added. Thereafter the plates were tested according to the basic predetermined testing procedure outlined above starting the step (4). An operation point of 150 $mA/cm^2$ was chosen to obtain the power ratings of 55 KW and 30

KW. Note that this is lower than the current density required from commercial plates to obtain the same power ratings.

With respect to step (4), the conventional plates were discharged at 66 amps (175 mA/cm$^2$) and charged at 27 amps (72 mA/cm$^2$) respectively, corresponding to 47.5 KW and 25.9 KW ratings for a 550 pound battery system made up of such plates. Discharge time was 25 seconds and the cutoff voltage was 1.5 volts/cell. Charge time was 61 seconds and the cutoff voltage was 2.75 volts/cell. In contrast, the five bipolar plates were discharged and charged at currents corresponding to 55 KW and 30 KW rates (for a 550 pound battery made up of such plates). The time period of discharge was 25 seconds and the charge period was 67 seconds, as long as the cutoff points (1.5 volt on discharge and 2.75 –3.0 volt on charge) were not exceeded. The charge time corresponds to less than 10 percent overcharge on each cycle. The use of slightly lower discharge and charge rates for the conventional plates was necessitated because of the current limitation of the equipment. However, if anything, longer plate life on cycling would be expected because the cycle is less severe at lower rates.

On testing in the described mode, the conventional positive plates failed or began to fail before the completion of 350 cycles of charging and discharging. The best of these plates had a capacity retention of 57 percent after 300 cycles and 34 percent after 400 cycles at the $c/5$ rate, with failure observed during this period. The other positive plates failed after 300 cycles (23 percent capacity retained) and 200 cycles (66 percent capacity retained). For the latter plate, only 3.5 percent capacity was retained after 300 cycles. Examination of these plates after testing revealed excessive buckling and in one case actual grid rupture. Also paste material was separated from each plate.

The two negative conventional plates stood up well with one showing a $c/5$ capacity decrease of only about 30 percent and the other about 23 percent after 500 cycles. Inspection of these plates after testing revealed a roughened surface structure but no excessive paste shedding or buckling. Clearly then, the performance capability of a commercial thin plate battery operated at high power density is severely hampered by the positive plates which have a limited cycle life.

Of five bipolar plates tested, Nos. 1–4 had lead conductors cut from a 20 mil sheet to a maximum width of 60 mils, while No. 5 had conductors made of round 20 mil lead wire. Plate Nos. 1–5 had retained capacities of 87, 102, 90, 91 and 89 percent after 300 cycles. Plates 1, 2, 4 and 5 also withstood 1,000 cycles without failure and after that number of cycles they had retained capacities of 47, 61, 51 and 48 percent respectively. Plate No. 3 completed 730 cycles before failure and had a retained capacity of 42 percent after that number of cycles. Thus the capacity retained by the bipolar plates was well in excess of that retained by the positive commercial plates. The voltage on discharge of cells with the bipolar plates was also high compared to cells with the commercial plates. The voltage on charge reached almost 3 volts, but this did not appear to accelerate plate degradation. The difference in charging voltage on the bipolar plates compared to the conventional plates is attributed to the absence of antimony in the former. Antimony lowers the polarization of the positive plate and also lowers $H_2$–evolution on the negative plate. Because it is possible to eliminate antimony from the bipolar plates and yet still maintain cycling life, the advantage of maintenance free performance is thus realized with the bipolar plates. In the even that maintenace free operation is not crucial, then a lead-antimony alloy may also be used for the conducting strips (though the corrosion rate will be more extreme). In this case, no $H_3PO_4$ is required. Additionally, it is possible to use a lead-calcium or lead-calcium tin alloy in place of lead provided their use is commensurate with desired cell life as affected by corrosion and expansion. In the latter two instances, $H_3PO_4$ added to the electrolyte is desired.

It has been determined that with bipolar plates made according to this invention it is possible to construct a full-size battery (the plates of the bipolar test cells described herein were approximately one-sixth full size) which at an average discharge voltage of 180 V and an operating current density of 105 mA/cm$^2$ has a power density of 100 W/lb. Such a battery contains 14 modules in parallel, each with 100 cells in series, and is capable of extended cycling (in excess of 1,000 cycles) under high rate/shallow discharge operating conditions. Specifically, reference is made to the aforementioned 55 KW discharge rate and 30 KW recharge rate. Furthermore, the plates from such a battery have been operated successfully at 150 mA/cm$^2$ on extended cycling (up to 1,000 cycles), corresponding to a maximum power density of 135 W/lb. In this latter mode the full scale battery consists of 10 parallel modules each with 100 cells in series.

The energy density of a battery constructed from these bipolar plates is calculated as 9.7 Whr/lb at a power density of 100 W/lb when allowance is made for the excess electrolyte required to make full use of the available capacity per plate. The paste utilization is about 42 percent, the average discharge voltage is taken as 180 V and the total capacity of the battery is 29.7 Ahr. The battery is constructed from 11 parallel modules each with 100 cells in series and the operating current density is close to 130 mA/cm$^2$. At moderate discharge rates (C/5) taking an average discharge voltage of 200 V, the available capacity is 51 Ahr. and the energy density is 20 Whr/lb.

In contrast, a conventional thin plate SLI lead acid battery must operate at a current density of about 250 mA/cm$^2$ (and an average discharge voltage of 180 V) to achieve a power density of 100 W/lb. During cycling operation at this power density, the performance of the battery is not satisfactory because of positive plate limitations. No more than 350 complete cycles are available before failure. The battery consists of 100 cells in series with 5 positives and 4 negatives in parallel per cell.

The energy density of a conventional battery constructed in the above mode (100 W/lb) is calculated as 5.9 Whr/lb. when allowance is made for the excess electrolyte required to make full use of the available capacity per plate. The paste utilization is about 27 percent, the average discharge voltage is taken as 180 V and the total capacity of the battery is 18.5 Ahr. The operating current density is about 250 mA/cm$^2$. At moderate discharge rates (C/5), taking an average discharge voltage of 200 V, the available capacity is 47.6 Ahr. and the energy density is 17.3 Whr./lb.

It is to be noted also that in making a battery, the bipolar plates illustrated in the drawings are mounted so that the sections 11 of the frames 6 are on top and the opposite sections of the frames are at the bottom.

Obviously the invention is subject to other modifications. Thus for example, the base plate, grids and frames may be made of a plastic other than a polycarbonate. Thus they may be made of a thermoplastic material such as polyvinyl chloride or a polysulfone. Still other plastic materials that meet the requirements of being electrically insulating, having dimensional stability, being nonreactive to lead and lead alloys, being stable in a sulfuric acid electrolyte, and not becoming brittle at temperatures as low as −40° F or soft at temperatures as high as 150° F, are known to persons skilled in the art and may be used in place of the polycarbonate. Similarly the fibers forming the flock 32 may be made of a material other than those noted above, e.g. fibers of polymethylmethacrylate or polypropylene.

It is to be noted that also both ends of each lead conductor strip may be connected to the corresponding ends of a lead conductor on the opposite side of the plate, and that they may also be connected through the base plate at one or more intermediate points between their ends. In these modifications, like the illustrated embodiment, the plates have a long life because the conductor strips are capable of yielding unidirectionally under contraction and expansion forces; however, in these modifications, the plates are more susceptible to electrolyte leakage.

It is to be noted also that the grids and frame cooperate to function as retention means for the conductive strips. These may be replaced by unitary elements combining the struts of the grids and the border of the frames, with the latter being thicker than the struts so as to predetermine the thickness of the layers of paste. It also is contemplated that the base plate 2 may be modified by omitting from its upper section that portion extending between the dotted lines 3, so as to form an open slot to facilitate mounting of the conductive strips 8. If this is done, another part made of the same material may be secured to the base plate to fill in the slot after the lead strips have been applied, or alternatively the upper ends of the frames 6 may be extended to fill in the slot when the substrate is thermoformed in a mold as previously described.

Still other modifications may be made without departing from the principles of this invention.

What is claimed is:

1. A battery plate comprising a plastic base plate, a plurality of spaced conductor strips made of lead or a lead alloy disposed on each side of said base plate, with each strip on one side of said plate being connected with a strip on the opposite side of said plate, plastic strip retention means on opposite sides of said plate, said plastic strip retention means each comprising a frame defining an aperture and at least one bar extending across said aperture, each of said plastic retention means being disposed so that opposite portions of its said frame overlie the opposite ends of the adjacent strips and its said at least one bar overlies and extends across said adjacent strips between the said ends of said adjacent strips, said plastic retention means being bonded to said base plate so that said frames and bars hold the ends and intermediate portions of said strips against said base plate, and a layer of lead oxide paste material covering the strips on one side of said base plate and a layer of a lead paste material covering the strips on the opposite side of said base plate.

2. A bipolar battery plate according to claim 1 wherein said layers of paste material have a thickness equal to about the thickness of said frame.

3. A bipolar battery plate according to claim 1 wherein said layers of paste fill said aperture.

4. A bipolar battery plate according to claim 1 wherein each strip on one side of said base plate is joined to the end of a strip on the other side of said base plate.

5. A bipolar battery plate according to claim 1 wherein said layers of paste material include electrically inert fibrous material.

6. A bipolar battery plate according to claim 1 further including fibers overlying and bonded to each side of said base plate, with said layers of paste bonded to said fibers.

7. A bipolar battery plate according to claim 1 wherein said strips are formed of lead.

8. A bipolar battery plate according to claim 1 wherein said base plate and retention means are formed of a thermoplastic.

9. A bipolar battery plate according to claim 8 wherein said thermoplastic is a polycarbonate.

10. A bipolar battery plate according to claim 1 wherein said base plate has an opening with said strips being connected through said opening and further wherein a portion of the frame of each retention means overlies and closes off said opening.

11. A battery plate comprising a base plate made of an electrically insulating plastic material, a plurality of mutually spaced conductive metal strips overlying each side of said base plate, grid retention means for retaining said strips to said base plate, said retention means being made of an electrically non-conductive plastic and comprising (1) at least one strut extending over and across said strips and (2) opposite end sections spaced from said at least one strut and overlying the ends of said strips, said retention means being bonded to said base plate, and an ionically active mass on each side of said base plate covering said strips.

12. A battery plate according to claim 11 wherein said base plate and said retention means are made of a thermoplastic material.

13. A battery plate according to claim 11 wherein said strips are made of lead or an alloy of lead, calcium, antimony or tin.

14. A battery plate according to claim 11 further including a flock of electrically inert and $H_2SO_4$-stable fibers overlying and bonded to each side of said base plate, with said ionically active masses being attached to said flocks.

15. A battery plate according to claim 1 wherein said plastic strip retention means are electrically insulating.

16. A battery plate according to claim 11 wherein each strip on one side of said base plate is connected through an opening in said base plate to a strip on the other side of said base plate.

17. A battery plate comprising a base plate made of an electrically insulating material and having first and second opposite sides, first and second pluralities of mutually spaced conductive strips overlying said first and second sides respectively of said base plate, first and second grid members made of electrically insulating material disposed on said first and second opposite sides of said base plate, each grid member comprising a frame defining an aperture and at least one strut extending across said aperture, opposite portions of the frame of said first member overlying the opposite ends of the strips of said first plurality of strips and said at least one strut of said first member extending over and across the strips of said first plurality of strips, opposite portions of the frame of said second member overlying the opposite ends of the strips of said second plurality of strips and said at least one strut of said second member extending over and across the strips of said second plurality of strips, portions of said first and second grid members being bonded to said base plate with portions of said strips captivated between said grid members and said base plate, and an ionically active mass on each side of said base plate covering said strips.

18. A battery plate according to claim 17 wherein each strip on each side of said base plate is an integral extension of a strip on the other side of said base plate.

19. A flat battery plate comprising a base plate having first and second opposite sides, a plurality of mutually spaced elongate metal conductor strips each having a first section extending through an opening in said base plate and second and third sections disposed along and engaging said first and second opposite sides respectively, and first and second conductor strip retention means made of an electrically insulating plastic material and bonded to selected portions of said first and second opposite sides respectively, said first and second retention means comprising first and second grid means that overlie and engage spaced apart portions of said second and third sections respectively and hold said spaced apart portions against said base plate, and first and second ionically active masses bonded to said first and second opposite sides of said base plate and overlying and engaging said second and third sections respectively of said strips.

* * * * *